Aug. 9, 1960   G. L. ROWE ET AL   2,948,544
WHEEL-ADJUSTING MECHANISMS FOR LAWN MOWERS
Filed May 8, 1958   3 Sheets-Sheet 1
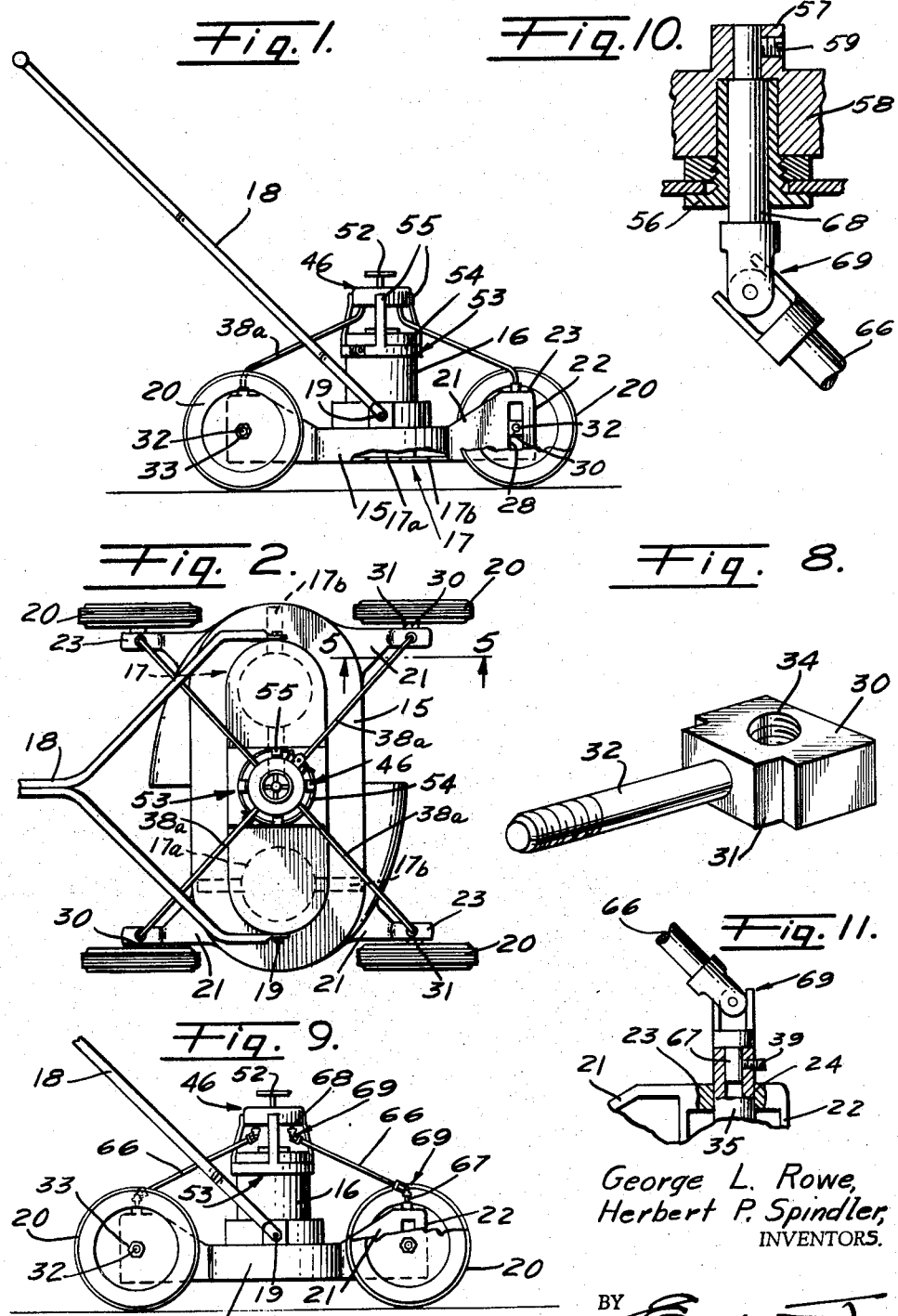
George L. Rowe,
Herbert P. Spindler,
INVENTORS.
BY
Attorney

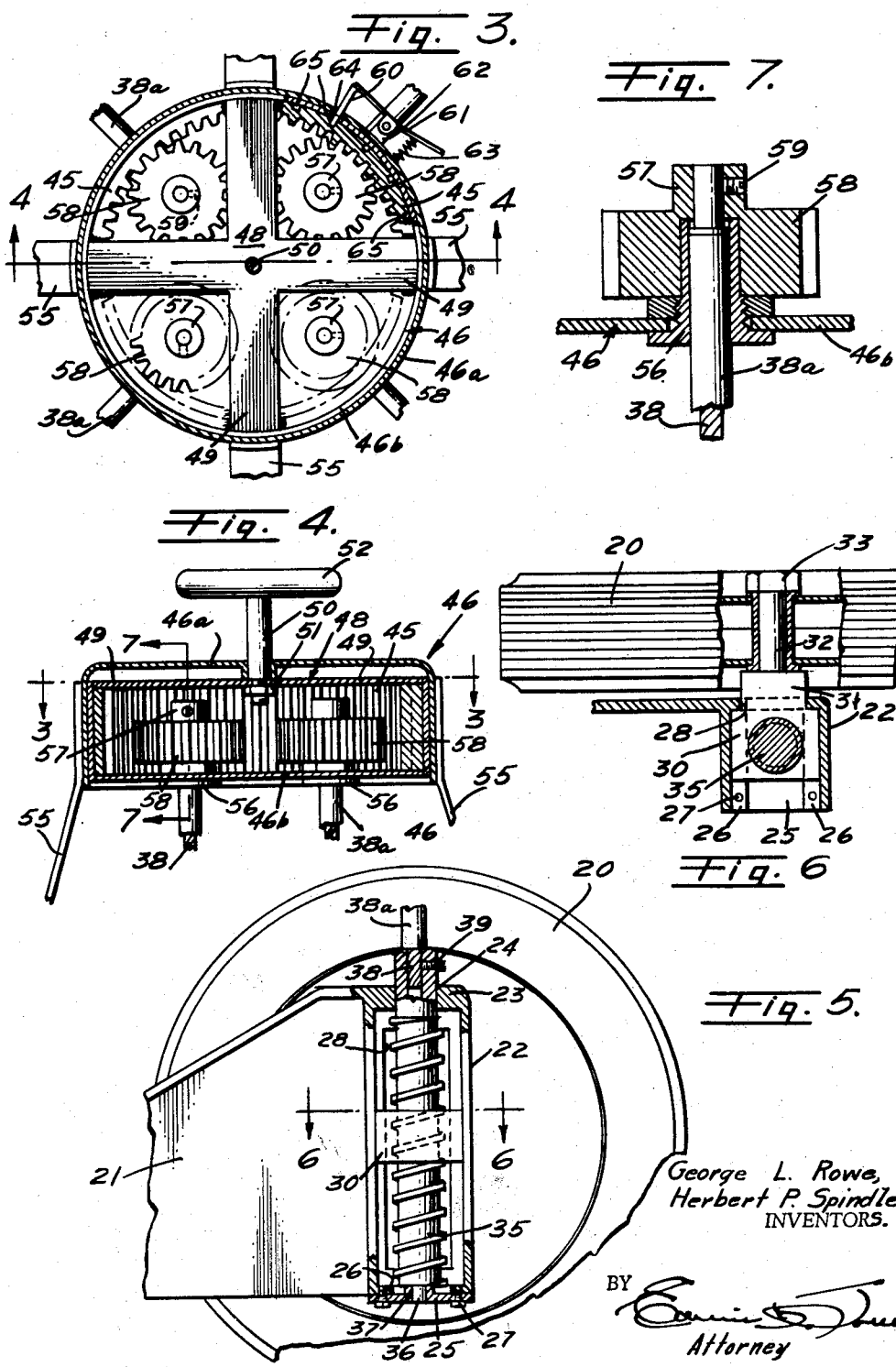

Aug. 9, 1960    G. L. ROWE ET AL    2,948,544
WHEEL-ADJUSTING MECHANISMS FOR LAWN MOWERS
Filed May 8, 1958    3 Sheets-Sheet 3
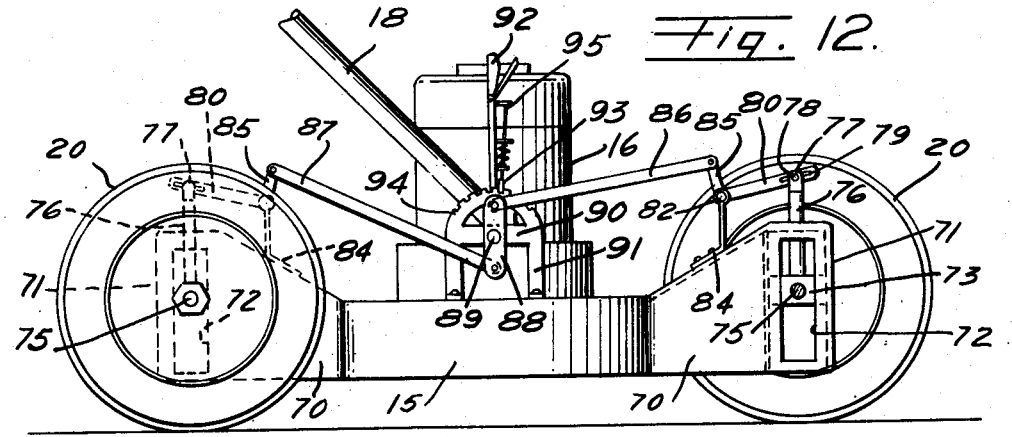
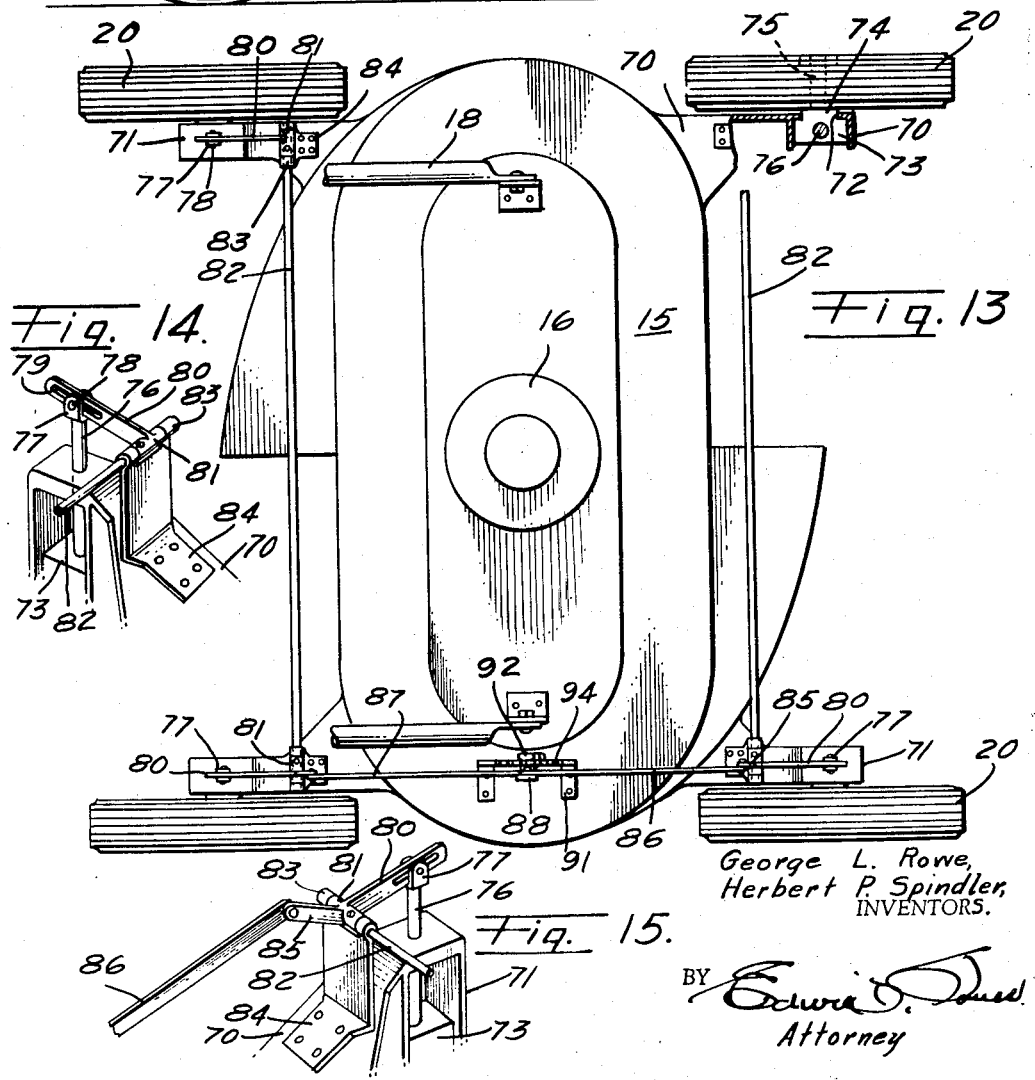
George L. Rowe,
Herbert P. Spindler,
INVENTORS.
BY
Attorney

United States Patent Office 2,948,544
Patented Aug. 9, 1960

2,948,544

WHEEL-ADJUSTING MECHANISMS FOR LAWN MOWERS

George L. Rowe and Herbert P. Spindler, both of 2551 Wellesley Ave., Los Angeles 64, Calif.

Filed May 8, 1958, Ser. No. 734,038

6 Claims. (Cl. 280—43.13)

Our invention relates to lawn mowers of the type embodying a chassis supported for rolling movement on four wheels, one or more power-driven grass-cutting elements each rotatable about vertical axes, and a mechanism which is operable to simultaneously adjust the supporting wheels vertically so that the grass-cutting elements are caused to mow grass at any predetermined height desired.

In such wheel-adjusting mechanisms, the mountings for the wheels interfere with the grass-cutting elements cutting grass close to the edge of a lawn along a fence, wall, pavement, tree, or other obstruction, thus necessitating the subsequent use of a lawn edge cutter.

It is a purpose of our invention to provide in a lawn mower of the above-described type, a wheel-adjusting mechanism that enables the wheels to be adjustably mounted on the chassis so that in any position of vertical adjustment thereof they do not interfere with the cutting elements from mowing grass along any obstruction and so close thereto as to eliminate the subsequent use of an edge cutter.

A further purpose of our invention is to provide a wheel-adjusting mechanism which embodies manually-operated gear means, and flexible or rigid shafts actuated thereby to operate worm shafts for moving the wheel axles simultaneously in vertical rectilinear paths, and releasable means for locking the gear means to maintain any adjustment of the wheel axles.

Still another purpose of our invention is the provision of a wheel-adjusting mechanism which embodies links, levers, and shafts interconnected so as to be manually operable by a single master lever to effect simultaneous and identical adjustment of all of the wheels of the mower in vertical rectilinear paths, and releasable means for locking the master lever against movement to maintain any predetermined adjustment of the wheels.

We will describe only one form of lawn mower, and three forms of wheel-adjusting mechanisms, each embodying our invention, and will then point out the novel features thereof in claims.

In the accompanying drawings:

Fig. 1 is a view showing in side elevation a mower embodying one form of wheel-adjusting mechanism embodying our invention.

Fig. 2 is a top plan view of the mower and mechanism shown in Fig. 1.

Fig. 3 is an enlarged horizontal sectional view taken on the line 3—3 of Fig. 4.

Fig. 4 is a vertical sectional view taken on the line 4—4 of Fig. 3.

Fig. 5 is an enlarged view taken on the line 5—5 of Fig. 2.

Fig. 6 is a sectional view taken on the line 6—6 of Fig. 5.

Fig. 7 is an enlarged vertical sectional view taken on the line 7—7 of Fig. 4.

Fig. 8 is an enlarged detailed perspective view of one of the slidable blocks and wheel axle embodied in the wheel-adjusting mechanism.

Fig. 9 is a view similar to Fig. 1 showing a second form of wheel-adjusting mechanism.

Fig. 10 is a view similar to Fig. 7 showing the connection between one of the upper short shafts of Fig. 9 and the respective gear.

Fig. 11 is an enlarged fragmentary vertical sectional view showing the connection between one of the lower short shafts of Fig. 9 and the respective worm shaft.

Fig. 12 is a side elevational view of a mower having embodied therein a third form of wheel-adjustnig mechanism embodying our invention.

Fig. 13 is a top plan view of the mower and wheel-adjusting mechanism shown in Fig. 12 with a portion thereof in horizontal section, and one of the shafts of the mechanism broken away.

Fig. 14 is an enlarged fragmentary perspective view showing the mounting for one end of one shaft of the wheel-adjusting mechanism, and its operative connection with one of the wheel-adjusting blocks.

Fig. 15 is a view similar to Fig. 14 showing the mounting of the other end of the same shaft, the operative connection between the shaft end and one of the wheel-adjusting blocks, and the actuating lever and link for rotating the shaft.

Referring more particularly to the drawings, and to Figs. 1 and 2, a mower of the power-driven type is shown as comprising a chassis 15 upon the top side of which is mounted an electric motor or other prime mover 16 for a pair of rotary grass-cutting elements 17 of conventional form in that they comprise a disk 17a and blades 17b secured to and extending radially from the disk as shown in broken lines in Fig. 2. A conventional handle 18 is pivotally mounted as at 19 on the chassis 15 for manual manipulation to push and guide the mower in its use on a lawn.

The chassis 15 is supported for rolling movement by four wheels 20, and these wheels are individually mounted on the chassis for simultaneous adjustment in vertical rectilinear paths in relation to the chassis in order to vary the vertical position of the cutting element 17 so that grass can be cut to a length determined by vertical adjustment of the cutting elements.

The mountings of all four wheels are identical and, therefore, a description of one mounting will suffice for all. Each wheel mounting comprises an arm 21 rigidly fixed to the chassis 15 at one corner thereof, and projecting forwardly or rearwardly therefrom as the case may be, in a vertical plane which is to the inner side of the adjacent end of the chassis.

As best shown in Fig. 5, the free end of the arm 21 is formed with a vertically extending frame or sleeve 22 permanently closed at its upper end by a wall 23 provided with an opening 24, while its lower end is open but closed by a plate 25 removably secured to a pair of flanges 26 on the sleeve, by bolts 27. As shown in Fig. 6, the sleeve 22 is square in cross-section, and one side thereof is formed with a slot 28 while its opposite side is completely open to gain access to the parts therein for lubrication and removing grass therefrom.

Slidable vertically within the sleeve 22 is a block-shaped member 30 having a reduced extension 31 movable lengthwise in the slot 28, and formed with an axle 32 upon which the wheel 20 is journalled and retained by means of a nut 33. The member 30 is formed with an opening 34 the wall of which is screw-threaded to receive a worm shaft 35 which, at its lower end, is formed with a reduced extension 36 journalled in a bearing 37 formed on the plate 25. The upper end of the shaft 35 extends upwardly through the sleeve opening 24 where it is made tubular to receive one end of a flexible shaft 38 contained in a tube 38a, and to which the shaft is secured by a set screw 39.

The afore-described wheel mounting provides vertical rectilinear adjustment of the wheel 20 on the arm 21 through rotation of the worm shaft 35 to cause the member 30 to move upwardly or downwardly within the sleeve 22 according as the shaft is rotated in one direction or the other, and to thereby move the axle 32 vertically in one direction or the other and thus lower or elevate the wheel in relation to the arm.

As shown in Figs. 1 and 2, the wheel-adjusting mechanism of our invention also includes one flexible shaft 38 for each of the wheel mountings. These shafts are capable of simultaneous rotation in either direction to lower or elevate the members 30 simultaneously and identical distances through the provision of the following elements: As shown in Figs. 3 and 4 an internal ring gear 45 is rotatably fitted in a casing 46 comprising an upper part 46a and a lower part 46b. Both casing parts are of cup form but the upper part is inverted as secured to the lower part.

A frame 48 of cross form has terminal arm portions 49 welded to the top side of the gear 45 so that the arms of the frame radiate from the center of the gear. Journalled in the center of the upper casing part 46a is a shaft 50, the lower end thereof being secured by a nut 51 to the center of the frame 48, and the upper end having a wheel 52 fixed thereto.

The casing 46 is supported in fixed position horizontally above the motor 16 by a frame 53 comprising an annulus 54 secured to and surrounding the motor 16 and upstanding arms 55 having their upper ends welded to the perimeter of the casing part 46a.

Each flexible shaft 38 and its tubing 38a are extended upwardly from the worm shaft 35 into a bushing 56 secured within the bottom of the casing 46, as best shown in Fig. 7, and with the upper end of the shaft extending into the hub 57 of a pinion or gear 58, and secured therein by a set screw 59.

As best shown in Fig. 3, four gears 58 are mounted within the casing 46 to constantly mesh with the ring gear 45 so that under rotation of the latter through manual rotation of the wheel 52, all four gears can be rotated in one direction or the other to impart corresponding movements simultaneously to all four shafts 38 to effect vertical and rectilinear adjustment of all four wheels 20 simultaneously.

The gear 45 can be releasably locked in various circumferential positions to maintain the wheels 20 in any predetermined position of vertical adjustment through the provision of a latch pin 60 (see Fig. 3). The latch pin 60 is mixed on one end of a lever 61 pivoted on a bracket 62 fixed to the casing 46, and urged by a spring 63 to cause the pin to be pushed inwardly in an opening 64 to engage within any one of several recesses 65 in the outer periphery of the gear 45.

From the preceding description it will be clear that to effect simultaneous vertical and rectilinear adjustment of all for wheels 20 to adjust the cutting elements 17 to any elevation for cutting grass at any predetermined height, the operator merely rotates the wheel 52 thereby rotating the gear 45 to, in turn, rotate the gears 58 and thus operate the four shafts 38 to, in turn, turn the worm shafts 35 thereby vertically adjusting the axles 32 through movement of the members 30 to lower or elevate all wheels 20 the same distance depending upon the direction of rotation of the wheel 52.

Prior to rotation of the wheel 52 the latch pin 60 is moved out of engagement with the gear 45 through manual actuation of the lever 61 against the tension of the spring 63 so as to release the gear. However, once adjustment of the wheels has been effected the lever 61 is released thus causing the pin 60 to be moved into any one of the recesses 65 and lock the gear 45 against rotation in either direction thereby maintaining adjustment of the wheels.

By virtue of the fact that the wheels 20 when adjusted move in vertical rectilinear paths which parallel each other, the distances between the wheel axles 32 remains constant. This provides a substantial support for the chassis at any elevation and relieves the chassis of any damaging stresses or strains during use of the mower. It also affords accurate adjustment of the wheels and positive maintenance of such adjustment.

From a consideration of Figs. 2 and 6 it will be seen that because of the location of the arm 21 on the chassis 15 coupled with the fact that the wheels 20 are adjustable in vertical planes paralleling and close to the arms, the planes of the outer sides of the wheels are coincident with the outer ends of the blades 17b as they rotate between the wheels. Thus in use of the mower the wheels do not interfere with the blades cutting grass so close to the edge of a lawn where it is bordered by a fence, pavement or other obstruction, as to eliminate the subsequent use of an edge cutter.

Referring now to Fig. 9, a second form of mechanism embodying our invention is disclosed by which identical, simultaneous, vertical, and rectilinear adjustments of the wheels 20 can be effected. This mechanism is identical to the one shown and described in Figs. 1 and 2 with the exception that the shafts 66 instead of being flexible, are rigid and operatively connected at their opposite ends to short shafts 67 and 68 through universal joints 69.

In the instance of each shaft 67, it is extended into the upper end of the worm shaft 35 and secured thereto by set screw 39 as shown in Fig. 11. The shaft 68 is extended into bushing 56 and hub 57, and secured to the latter by set screw 59 as shown in Fig. 10. Thus the shafts 66, 67 and 68 together with the universal joints 69 provide an operative connection between the gears 58 and the worm shafts 35 so that by rotation of the gears the worm shafts are rotated to effect identical vertical, and simultaneous adjustment of all of the wheels 20.

Referring now to Figs. 12 and 13, a third form of wheel-adjusting mechanism embodying our invention is shown applied to the same type of mower as shown in Fig. 1. This mechanism includes individual mountings for the wheels 20 each of which comprises an arm 70 rigid on the chassis 15 and formed at its free end with an upstanding rectangular sleeve 71 completely open at one side to partly close at the other to provide a slot 72. Slidable vertically in the sleeve 71 is a block 73 having a reduced portion 74 movable vertically in the slot 72 and having fixed thereon an axle 75 on which the respective wheel 20 is mounted.

A part of the mechanism for actuating the block 73 to lower or elevate the wheel comprises a rod 76 fixed on the top side of the block and extending through a suitable opening in the top end of the sleeve and provided at its upper end with spaced ears 77. A pin 78 extends through the ears 77 and through a slot 79 in one end of an arm 80. The other end of the arm is provided with a sleeve 81 pinned to one end of a shaft 82, the latter being rotatable in sleeves 83. The sleeves 83 are disposed at opposite ends of the sleeve 81 and formed on the upper end of a bracket 84 bolted to the top side of the arm 70.

As shown in Fig. 13, there are two shafts 82, one for each pair of wheels 20. One end of one shaft 82 is mounted in the sleeves 83 of one bracket 84 as shown in Fig. 14, while the other shaft end is mounted in the sleeves 83 of the companion bracket as shown in Fig. 15. The sleeve 81 in Fig. 15 has fixed thereto, in addition to the arm 80, a second arm 85 which coacts with the arm 80 to form a bell-crank lever.

The mechanism for actuating the bell-crank levers for the blocks 73 of the respective wheel mountings, comprises links 86 and 87, and a crank member 88 fixed to a shaft 89 journalled in a cross member 90 of a bracket 91. One end of the link 86 is pivotally connected to the respective arm 85, and the other end of the link is pivotally connected to one end of the crank member 88. One end of the link 87 is pivotally connected to the free end of the respective arm 85, and at its other end to the other end of the link 88.

Rotation of the crank member 88 in either direction to actuate the links 86 and 87 is effected by means of a hand-operated master lever 92 which is fixed to the shaft 89 and can be releasably secured in any position of adjustment by means of a tooth 93 that engages a rack 94 formed on the bracket 91 which is bolted to the chassis 15. Conventional means 95 is mounted on the lever 92 for actuating the tooth 93 to engage or disengage the rack 94.

From the foregoing description it will be understood that movement of the lever 92 in one direction or the other will actuate the links 86 and 87 to rotate the shafts 82 in one direction or the other and thereby actuate the bell-crank levers to move the respective rods 76 upwardly or downwardly thereby adjusting the blocks 73, and, hence, the respective wheels 20 vertically on the sleeves 71.

Likewise under rotation of the shafts 82 the blocks 83 of the other two wheel mountings will be adjusted vertically in the sleeves 71 to effect an adjustment of these wheels identical to the adjustment of the wheels of the other pair, since by rotation of the shafts the arms 80 in Figs. 13 and 14, will be rotated to actuate the respective rods 86.

Manifestly, the above-described mechanism is operable to simultaneously adjust all four wheels in vertical and rectilinear paths and to the same degree, and whereby the grass-cutting elements of the mower can be adjusted vertically to cut grass at any predetermined height. Also, the mounting of the wheels 20 on the chassis 15 is such as to provide the same grass-cutting advantage by the blades 17b as described in connection with the form of our invention shown in Fig. 2.

Although we have herein shown and described only three forms of wheel-adjusting mechanism each embodying our invention, it is to be understood that various changes and modifications may be made herein without departing from the spirit of our invention and the spirit and scope of the appended claims.

What we claim is:

1. A mower, including: a chassis; wheels for the chassis; individual means for so mounting the wheels on the chassis that each wheel is adjustable vertically and rectilinearly on the chassis, said means each comprising an arm fixed to the chassis, a sleeve fixed on the arm, a member slidable in the sleeve, an axle fixed to the member and upon which the wheel is mounted, a worm shaft threaded in the member; mechanisms for individually rotating the worm shafts; manually operable means for simultaneously actuating said mechanisms; and a manually operable spring-loaded device engageable with said manually operable means for releasably locking the latter in various positions to maintain the wheels in any adjusted position.

2. A mower, including: a chassis; wheels for the chassis; individual means for so mounting the wheels on the chassis that each wheel is adjustable vertically and rectilinearly on the chassis, said means comprising an arm fixed to the chassis, a sleeve fixed on the arm, a member slidable in the sleeve, an axle fixed to the member and upon which the wheel is mounted; a worm shaft threaded in the member; mechanisms for individually rotating the worm shafts, each mechanism including a shaft connected to the worm shaft, and a gear fixed to said shaft; an internal ring gear meshing with all of said gears; manually operable means for rotating the ring gear to simultaneously rotate all of the gears to, in turn, rotate all of said shafts; and means for releasably securing said ring gear in various positions of circumferential adjustment.

3. An adjusting means for the wheels of a lawn mower having a chassis and supporting wheels therefor arranged in pairs at the front and rear thereof; two pairs of arms fixed on the chassis; a sleeve fixed on each of said arms and of non-circular form in cross section; a block slidable in the sleeve; an axle fixed to the block and upon which one of said wheels is mounted; a worm shaft threaded in the block; a flexible shaft connected at one end to one end of the worm shaft; a gear fixed to the other end of the flexible shaft; a casing supported on the motor and in which all of said gears are mounted; an internal ring gear meshing with all of said gears; a frame fixed to said ring gear; a shaft fixed to the frame and journalled in and projecting from the casing for rotating said ring gear; and means mounted on the casing for releasably securing said ring gear in various positions of circumferential adjustment.

4. An adjusting means for the wheels of a lawn mower having a chassis and supporting wheels therefor arranged in pairs at the front and rear thereof; two pairs of arms fixed on the chassis; a sleeve fixed on each of said arms and of non-circular form in cross section; a block slidable in the sleeve; an axle fixed to the block and upon which one of said wheels is mounted; a worm shaft threaded in the block; a flexible shaft connected at one end to one end of the worm shaft; a gear fixed to the other end of said flexible shaft; a casing supported on the chassis and in which all of said gears are mounted; an internal ring gear meshing with all of said gears; a frame fixed to said ring gear; a shaft fixed to the frame and journalled in and projecting from the casing for rotating said ring gear; and means mounted on the casing the releasably securing said ring gear in various positions of circumferential adjustment.

5. A mower, including: a chassis; wheels for the chassis; individual means for so mounting the wheels on the chassis that each wheel is adjustable vertically and rectilinearly on the chassis, said means comprising an arm fixed to the chassis, a sleeve fixed on the arm, a member slidable in the sleeve, an axle fixed to the member and upon which the wheel is mounted, a worm shaft threaded in the member; mechanisms for individually rotating the worm shafts, each mechanism including a short shaft connected to the worm shaft; a long shaft, a universal joint connecting the short and long shafts, a second short shaft, a universal joint connecting the long shaft to the second short shaft, and a gear fixed to the second short shaft; an internal ring gear meshing with all of said gears; manually operable means for rotating the ring gear to simultaneously rotate all of the gears to, in turn, rotate all of said shafts; and means for releasably securing said ring gear in various positions of circumferential adjustment.

6. A mower, including: a chassis; wheels for the chassis; individual means for so mounting the wheels on the chassis that each wheel is adjustable vertically and rectilinearly on the chassis, said means comprising an arm fixed to the chassis, a sleeve fixed on the arm, a member slidable in the sleeve, an axle fixed to the member and upon which the wheel is mounted, a worm shaft threaded in the member; mechanisms for individually rotating the worm shafts, each mechanism including a shaft connected to the worm shaft, and a gear fixed to said shaft; an internal ring gear meshing with all of said gears; and manually operable means for rotating the ring gear to simultaneously rotate all of the gears to, in turn, rotate all of said shafts.

References Cited in the file of this patent

UNITED STATES PATENTS

| | | |
|---|---|---|
| 934,480 | Treiber | Sept. 21, 1909 |
| 1,973,098 | Pride | Sept. 11, 1934 |
| 2,042,489 | Williams | June 2, 1936 |
| 2,263,368 | Sejkora | Nov. 18, 1941 |
| 2,480,909 | Davis | Sept. 6, 1949 |
| 2,709,602 | Orr | May 31, 1955 |
| 2,728,582 | Knarzer | Dec. 27, 1955 |
| 2,776,844 | Wilkin | Jan. 8, 1957 |
| 2,788,219 | McCellan | Apr. 9, 1957 |

UNITED STATES PATENT OFFICE
CERTIFICATE OF CORRECTION

Patent No. 2,948,544                        August 9, 1960

George L. Rowe et al.

It is hereby certified that error appears in the printed specification of the above numbered patent requiring correction and that the said Letters Patent should read as corrected below.

Column 2, line 19, for "wheel-adjustnig" read -- wheel-adjusting --; line 39, after "they" insert -- each --; column 3, line 67, for "mixed" read -- fixed --; line 74, for "for" read -- four --; column 6, line 49, for "the" read -- for --.

Signed and sealed this 31st day of January 1961.

(SEAL)
Attest:

KARL H. AXLINE                               ROBERT C. WATSON
Attesting Officer                              Commissioner of Patents